United States Patent
Sandberg et al.

(10) Patent No.: US 11,283,536 B2
(45) Date of Patent: Mar. 22, 2022

(54) METHOD AND NETWORK NODE FOR REDUCING INTERFERENCE IN A WIRELESS NETWORK

(71) Applicant: TELEFONAKTIEBOLAGET LM ERICSSON (PUBL), Stockholm (SE)

(72) Inventors: David Sandberg, Solna (SE); Mats Åhlander, Täby (SE); Ari Kangas, Lidingö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/761,297

(22) PCT Filed: Sep. 15, 2016

(86) PCT No.: PCT/SE2016/050862
§ 371 (c)(1),
(2) Date: Mar. 19, 2018

(87) PCT Pub. No.: WO2017/052448
PCT Pub. Date: Mar. 30, 2017

(65) Prior Publication Data
US 2018/0270007 A1 Sep. 20, 2018

Related U.S. Application Data

(60) Provisional application No. 62/232,521, filed on Sep. 25, 2015.

(51) Int. Cl.
*H04J 11/00* (2006.01)
*H04L 27/26* (2006.01)
(Continued)

(52) U.S. Cl.
CPC .......... *H04J 11/0056* (2013.01); *H04L 5/005* (2013.01); *H04L 5/0007* (2013.01);
(Continued)

(58) Field of Classification Search
CPC .... H04J 11/0056; H04L 5/0007; H04L 5/005; H04L 5/0073; H04L 27/2613;
(Continued)

(56) References Cited

U.S. PATENT DOCUMENTS

2009/0252075 A1    10/2009  Ji et al.
2010/0067627 A1*   3/2010   Lincoln ............... H04L 25/0228
                                                      375/346
(Continued)

FOREIGN PATENT DOCUMENTS

EP    2 557 867 A1    2/2013
WO    2015/074719 A1  5/2015
WO    2017/052448 A1  3/2017

OTHER PUBLICATIONS

International Search Report and Written Opinion dated Sep. 1, 2017 issued in International Application No. PCT/SE2017/050695. (12 pages).
(Continued)

*Primary Examiner* — Faisal Choudhury
(74) *Attorney, Agent, or Firm* — Rothwell, Figg, Ernst & Manbeck, P.C.

(57) ABSTRACT

A method and a network node (700) serving a first cell in a wireless network, for reducing interference in a second cell caused by transmission of reference signals in the first cell. The network node (700) transmits (7:2) in the first cell a scheduling block where a number of said reference signals are located in predefined resource element positions in the scheduling block, using a time offset relative transmission of a scheduling block in the second cell. Thereby, the impact of interference from a reference signal from one network node will be distributed over several resource elements in the other network node so that the impact in each resource element is reduced, as compared to when all interference (Continued)

from the reference signal hits one single resource element when no time offset is used.

22 Claims, 7 Drawing Sheets

(51) Int. Cl.
 *H04L 5/00* (2006.01)
 *H04W 72/12* (2009.01)
 *H04W 56/00* (2009.01)

(52) U.S. Cl.
 CPC .......... *H04L 5/0048* (2013.01); *H04L 5/0053* (2013.01); *H04L 5/0062* (2013.01); *H04L 5/0073* (2013.01); *H04L 27/2613* (2013.01); *H04W 56/0005* (2013.01); *H04W 56/0045* (2013.01); *H04W 72/1268* (2013.01); *H04W 72/1289* (2013.01)

(58) Field of Classification Search
 CPC ... H04L 5/0048; H04L 5/0053; H04L 5/0062; H04W 72/1289; H04W 56/0005; H04W 56/0045; H04W 72/1268
 USPC .......................................................... 370/336
 See application file for complete search history.

(56) References Cited

U.S. PATENT DOCUMENTS

| | | | |
|---|---|---|---|
| 2011/0080896 A1 | 4/2011 | Krishnamurthy et al. | |
| 2011/0194527 A1 | 8/2011 | Lin et al. | |
| 2011/0280223 A1* | 11/2011 | Maeda | H04W 72/0446 370/335 |
| 2012/0099520 A1* | 4/2012 | Kwon | H04W 72/042 370/315 |
| 2012/0178482 A1 | 7/2012 | Seo et al. | |
| 2013/0083780 A1* | 4/2013 | Luo | H04W 72/0406 370/336 |
| 2014/0029508 A1 | 1/2014 | Kim et al. | |
| 2014/0219237 A1* | 8/2014 | Charbit | H04L 5/005 370/330 |
| 2014/0314000 A1 | 10/2014 | Liu et al. | |
| 2015/0094092 A1 | 4/2015 | Kangas et al. | |
| 2015/0103782 A1 | 4/2015 | Xu et al. | |
| 2015/0195841 A1 | 7/2015 | Lorca Hernando | |
| 2015/0372779 A1* | 12/2015 | Lim | H04W 56/003 370/338 |
| 2016/0234763 A1* | 8/2016 | Um | H04L 5/0007 |
| 2016/0294516 A1* | 10/2016 | Zirwas | H04L 5/0005 |
| 2017/0079028 A1 | 3/2017 | Dinan | |
| 2017/0086153 A1 | 3/2017 | Yoon et al. | |
| 2017/0099667 A1 | 4/2017 | Dinan | |
| 2017/0303220 A1 | 10/2017 | Sadeghi et al. | |
| 2017/0310435 A1 | 10/2017 | Wei et al. | |
| 2019/0037529 A1 | 1/2019 | Edge et al. | |
| 2019/0268925 A1 | 8/2019 | Ahlander et al. | |
| 2020/0260452 A1 | 8/2020 | Dinan | |

OTHER PUBLICATIONS

China Unicom: "Time Shifting to Protect Control Region from Legacy CRS Interference", 3GPP Draft; R1-114201, 3rd Generation Partnership Project (3GPP). 3GPP TSG-RAN WG1 Meeting #67, San Francisco, USA, Nov. 14-18, 2011. (retrieved Nov. 9, 2011) (4 pages).

International Search Report (ISR) and Written Opinion (WO) issued in PCT/SE2016/050862 dated Nov. 28, 2016 (11 pages).

Non-Final Office Action dated Jun. 1, 2020 issued in U.S. Appl. No. 16/333,473. (7 pages).

* cited by examiner

US 11,283,536 B2

METHOD AND NETWORK NODE FOR REDUCING INTERFERENCE IN A WIRELESS NETWORK

CROSS REFERENCE TO RELATED APPLICATION(S)

This application is a 35 U.S.C. § 371 National Stage of International Patent Application No. PCT/SE2016/050862, filed Sep. 15, 2016, designating the United States and claiming priority to U.S. provisional application No. 62/232, 521, filed on Sep. 25, 2015. The above identified applications are incorporated by reference.

TECHNICAL FIELD

The present disclosure relates generally to a method and a network node serving a first cell in a wireless network, for reducing interference in a second cell caused by transmission of reference signals in the first cell.

BACKGROUND

In a wireless network comprising a plurality of network nodes, it is desirable to utilize available radio resources as efficiently as possible so as to achieve high capacity and adequate performance in communication with wireless devices. The term "wireless network" is used in this description to denote any network comprising network nodes such as base stations, access points, eNodeBs or the like which are capable of radio communication with wireless devices, e.g. by transmitting scheduling blocks carrying reference signals and typically also various data and control information. The nodes in the network that performs such radio communication with wireless devices are also generally denoted "network nodes" herein. Further, the term "wireless device" denotes any communication equipment that is capable of radio communication with network nodes in a wireless network. Some non-limiting examples of wireless devices that may be involved in the procedures described herein include mobile phones, smartphones, tablets, laptop computers and Machine-to-Machine, M2M, devices. Throughout this description, the term "User Equipment", UE, may be used instead of wireless device.

In order to support coherent downlink reception as well as to evaluate whether a connection to a network node is suitable for communication and if so to configure various parameters for the communication, the wireless devices are requested to perform measurements on predefined reference signals which are regularly transmitted from the network node. In a wireless network operating according to Long Term Evolution, LTE, signals are transmitted by the network nodes using Orthogonal Frequency-Division Multiplexing, OFDM, which is a method of encoding digital data on multiple carrier frequencies. In this description the reference signals will be referred to as "Cell-specific Reference Signals", CRSes, which term is commonly used in LTE.

In downlink transmission according to LTE, the smallest schedulable resource is referred to as a "scheduling block" which is illustrated in FIG. 1. A downlink transmission may comprise multiple scheduling blocks which can be "stacked" the frequency domain to fill the available system bandwidth or any part thereof. A scheduling block 100 may typically extend over 180 kHz during 1 millisecond, ms. This resource 100 is further divided into 12 subcarriers in the frequency domain. In the time domain this resource is divided into 14 OFDM symbols as shown in FIG. 1 when a normal cyclic prefix is used, or 12 OFDM symbols when an extended cyclic prefix is used. The cyclic prefix is used in OFDM to maintain orthogonality between subcarriers when the signal is distorted by multipath propagation. The scheduling block 100 in FIG. 1 is shown as a "resource grid" divided into 12 elements in the frequency domain representing the subcarriers and 14 elements in the time domain representing the OFDM symbols.

The smallest resource in LTE is comprised of one Resource Element, RE, 100A which corresponds to one subcarrier 100B during one OFDM symbol 100C. The scheduling block 100 is thus comprised of 12×14 REs. The first 1 to 3 OFDM symbols in this example compose the control region where mainly the Physical Downlink Control Channel, PDCCH, is multiplexed. The rest of the OFDM symbols in the transport block 100 compose the data region, where mainly the Physical Downlink Shared Channel, PDSCH, is multiplexed.

Some resource elements in the time/frequency grid are used for transmitting CRSes which are indicated in FIG. 1 as striped resource elements, while the resource elements used for data and control are non-striped. A predetermined sequence of CRSes is transmitted in predefined RE positions known to the wireless devices. The CRSes can be used by wireless devices for synchronization, channel estimation, determination of a Channel Quality Indicator, CQI, a Rank Indicator, RI and a Precoding Matrix Indicator, PMI, as well as for mobility measurements such as the Reference Signal Received Power, RSRP, etc.

Since CRSes are used also for cell measurements by wireless devices in idle mode which are more or less unknown to the network, the CRSes have to be transmitted even if there are no wireless devices attached to the cell. Note that this description has been simplified to involve only one antenna. If more antenna ports are used (e.g. 2 or 4), the resource grid of one antenna will contain unused REs in positions that are used for a CRS on the other antenna.

However, when a scheduling block is transmitted in two cells at the same time, the CRSes in the two cells will coincide and may therefore also interfere with each other, which is illustrated in FIG. 2. In this figure, CRSes are transmitted in the predefined REs by a network node 100 of a first cell 100A and also by a network node 102 of a second cell 102A. When wireless devices 104 present in the first cell 100A try to measure the CRSes from the network node 100, they will also receive interfering CRSes from the network node 102. Similarly when wireless devices 106 present in the second cell 102A try to measure the CRSes from the network node 102, they will also receive interfering CRSes from the network node 102. The interfering CRSes are indicated by dashed arrows.

As a result, the CRS measurements in either cell will be too "pessimistic" due to the interference of CRSes from the other cell, and if the CRS measurements are used for channel estimation or the like the channel may be under-estimated since the above harmful interference from CRSes that made the CRS measurements pessimistic will not occur when data is transmitted. The capacity of the network may therefore not be fully utilized due to such pessimistic and misleading CRS measurements. This under-estimation of the channel can be avoided by not transmitting the CRSes in the same REs in the two cells, but then the CRSes in one cell may instead interfere with data transmissions in the other cell.

SUMMARY

It is an object of embodiments described herein to address at least some of the problems and issues outlined above. It is possible to achieve this object and others by using a method and a network node as defined in the attached independent claims.

According to one aspect, a method is performed by a network node serving a first cell in a wireless network, for reducing interference in a second cell caused by transmission of reference signals in the first cell. In this method the network node transmits in the first cell a scheduling block where a number of said reference signals are located in predefined resource element positions in the scheduling block, using a time offset relative transmission of a scheduling block in the second cell.

According to another aspect, a network node is arranged to serve a first cell in a wireless network, and to reduce interference in a second cell caused by transmission of reference signals in the first cell. The network node is configured to transmit in the first cell a scheduling block where a number of said reference signals are located in predefined resource element positions in the scheduling block, using a time offset relative transmission of a scheduling block in the second cell.

When the above method and network node are employed, it is an advantage that the impact of interference from each reference signal in the scheduling block transmitted in the first cell will be distributed over several resource elements in the scheduling block transmitted in the second cell, so that the interference hitting each individual resource elements is reduced. Thereby, the interference from a reference signal in the first cell will hit multiple resource elements in the second cell instead of hitting just one resource element, so that the highest interference power in one resource element is reduced and the wanted signal therein can be detected and decoded more successfully due to the lower interference.

The above method and network node may be configured and implemented according to different optional embodiments to accomplish further features and benefits, to be described below.

A computer program is also provided comprising instructions which, when executed on at least one processor in the network node, cause the at least one processor to carry out the method described above. A carrier is also provided which contains the above computer program, wherein the carrier is one of an electronic signal, optical signal, radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to reduce the impact of interference from transmission of reference signals, such as CRSes, in a scheduling block by applying a time offset in one cell relative another neighboring cell so that the scheduling blocks will not be transmitted at the same time in the two cells but with a time difference corresponding to the time offset. Thereby, the interference from a transmitted CRS will not hit a single RE in either cell but it will be distributed, or "spread out", over two or more REs which reduces the impact on each RE in the opposite cell. The time offset may be a fraction of the duration of an OFDM symbol. In this description, the term "neighboring cells" is used to indicate that the cells are located close enough to cause interference across the cells. Hence, the neighboring cells may or may not border one another.

Figure 1:
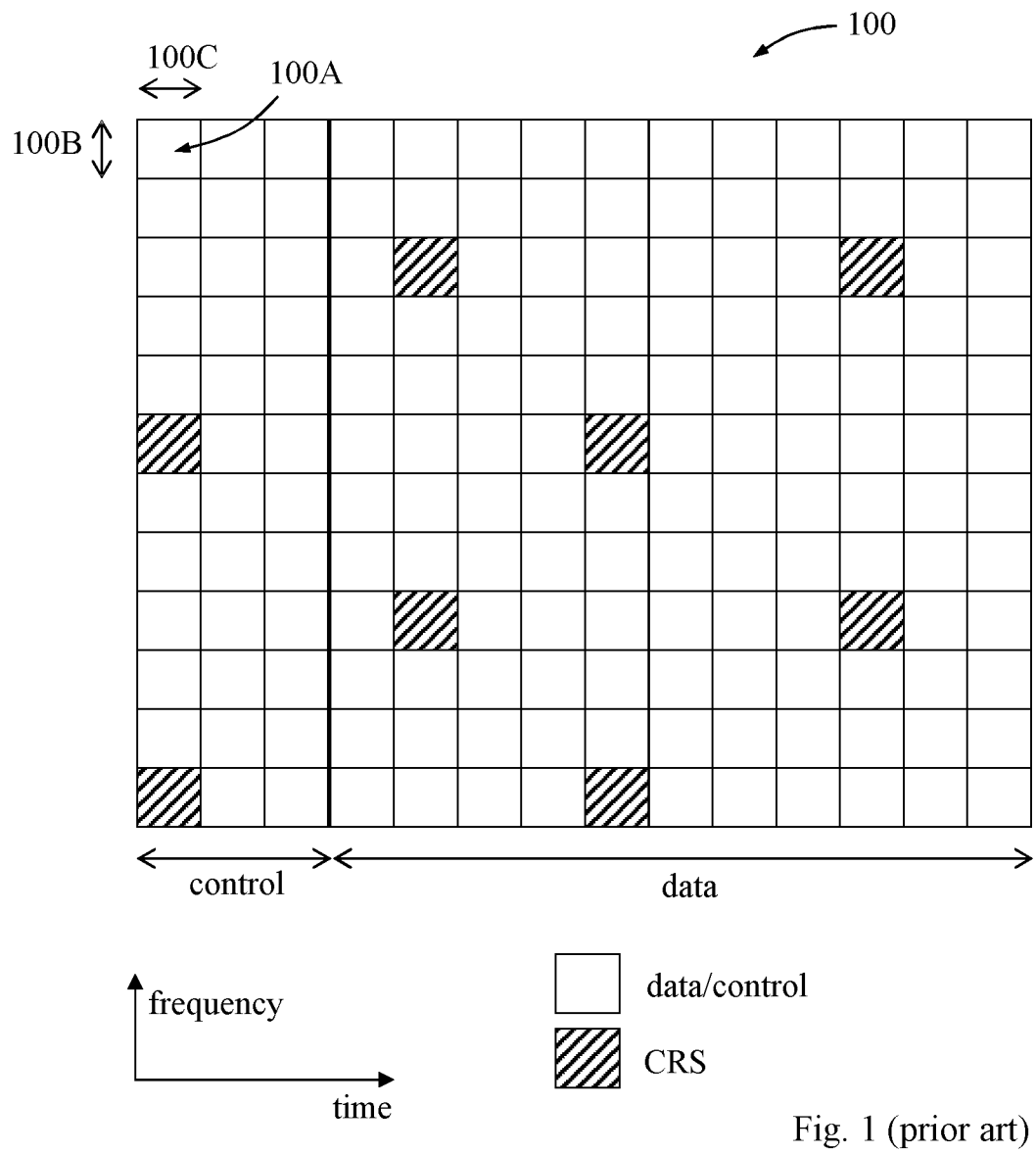
FIG. 1 illustrates a regular downlink scheduling block with resource elements used for reference signals in predefined positions, according to the prior art.
Figure 2:
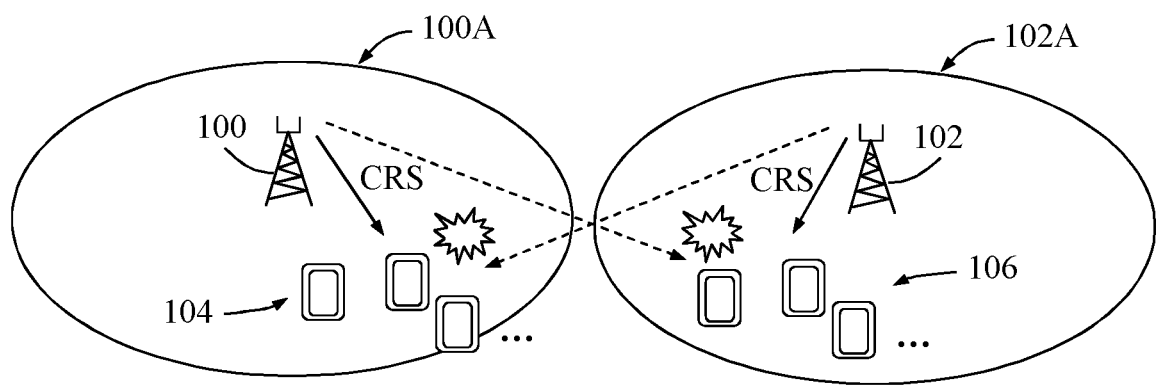
FIG. 2 is a communication scenario illustrating how transmission of CRSes simultaneously in two cells may cause interference, according to the prior art.
Figure 3:
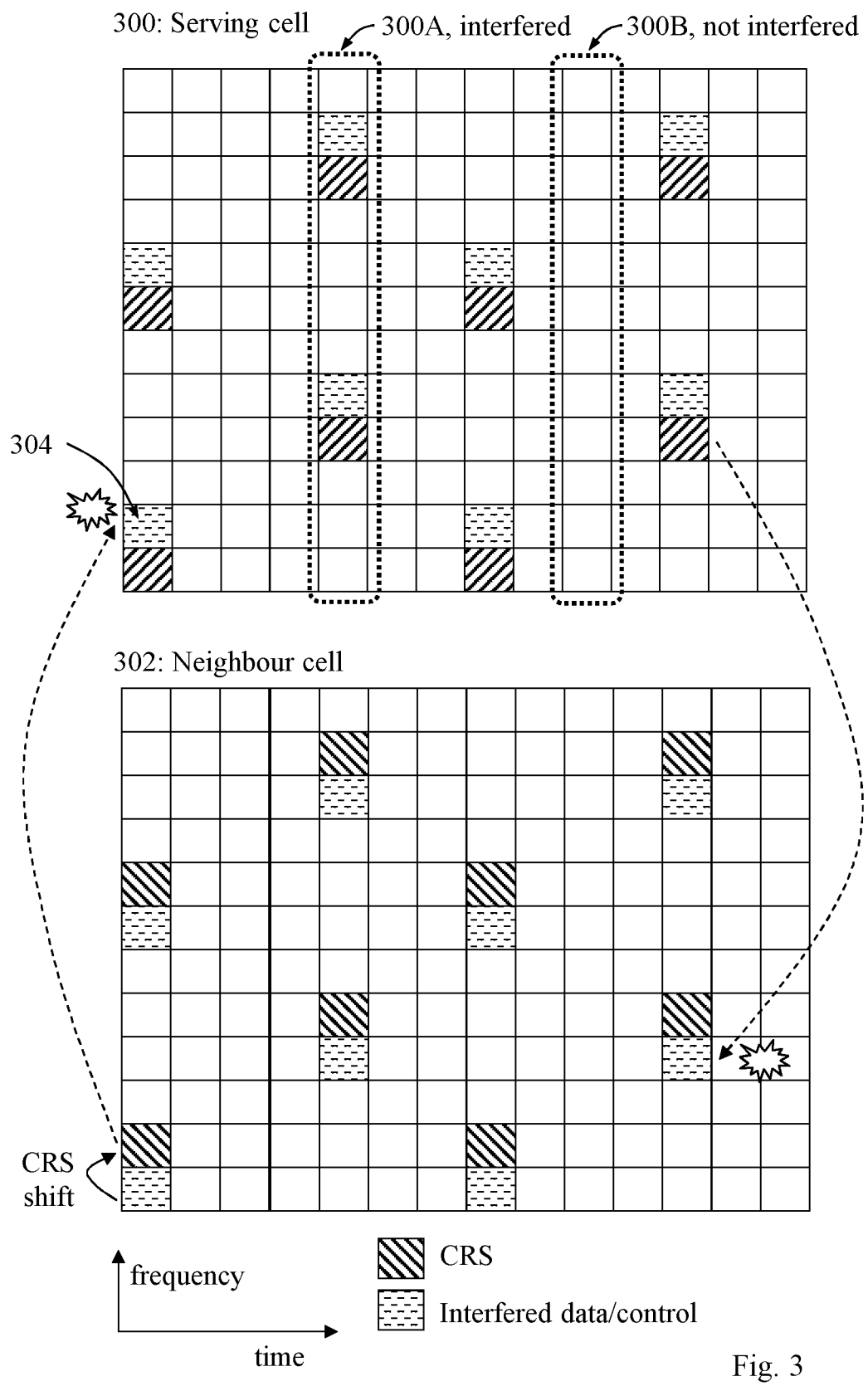
FIG. 3 illustrates how CRSes transmitted in one cell may interfere with data and control signals transmitted in another cell when shifted CRSes are used, according to the prior art.

One possible way of avoiding the above-described interference between CRS transmissions in two cells is to shift the CRSes one or two REs only in the frequency domain in one of the cells, which is illustrated in FIG. 3 depicting a scheduling block 300 transmitted in a serving cell and a scheduling block 302 transmitted in a neighbor cell. In this example, the scheduling block 300 is transmitted in the serving cell with CRSes positioned as shown in FIG. 1, and at the same time the scheduling block 302 is transmitted in the neighbor cell with all CRSes shifted one RE in the frequency domain. FIG. 3 thus illustrates what happens if the above time offset of the embodiments herein is not applied at shifted CRSes.

As indicated above, transmission of such shifted CRSes may instead cause interference by hitting REs used in another cell for data or control, e.g. as indicated by dashed arrows. An example RE that is hit by such interference is denoted 304. It should be noted that such interference may also occur in the opposite direction when shifted CRSes are applied in one of the cells.

In conclusion, the above-described CRS interference from one cell to another cell when shifted CRSes are not applied in any of the cells, may lead to under-utilized radio resources and low throughput due to the pessimistic and misleading CRS measurements. On the other hand, shifted CRSes provides more accurate channel quality estimation, but the CRS transmissions cause interference on data resource elements instead in the opposite cell. Some further negative effects of the CRS interference may be as follows.

A scheduling block may include one or more so-called "turbo blocks" which are used to carry bits configured for turbo coding which is well known in this field. Typically, the bits in multiple turbo blocks transmitted in several successive scheduling blocks are used in combination for error correction or the like. FIG. 3 further illustrates that one such turbo block 300A transmitted in the serving cell is hit by interference from the CRSes transmitted in the neighbor cell, while another turbo block 300B in the serving cell is not hit by such interference. As a result, the turbo coding across the multiple turbo blocks will be corrupted in total even if only one (or a few) turbo block in the sequence is hit by CRS interference.

In other words, since one transport block typically contains more than one turbo block and LTE maps out REs sequentially for each turbo block, sometimes only a few turbo blocks are hit by CRS interference, whereas other turbo blocks are clean. And since a process referred to as Hybrid Automatic Repeat Request, HARQ, performs retransmissions based on a Cyclic Redundancy Check, CRC, of the turbo blocks, the performance is determined by the worst, i.e. most interfered, turbo block. This means that a transmission where all code blocks are received with CRC OK except for one that is hit by CRS interference, will have to be retransmitted which will therefore consume scarce transmission or radio resources.

Figure 4:
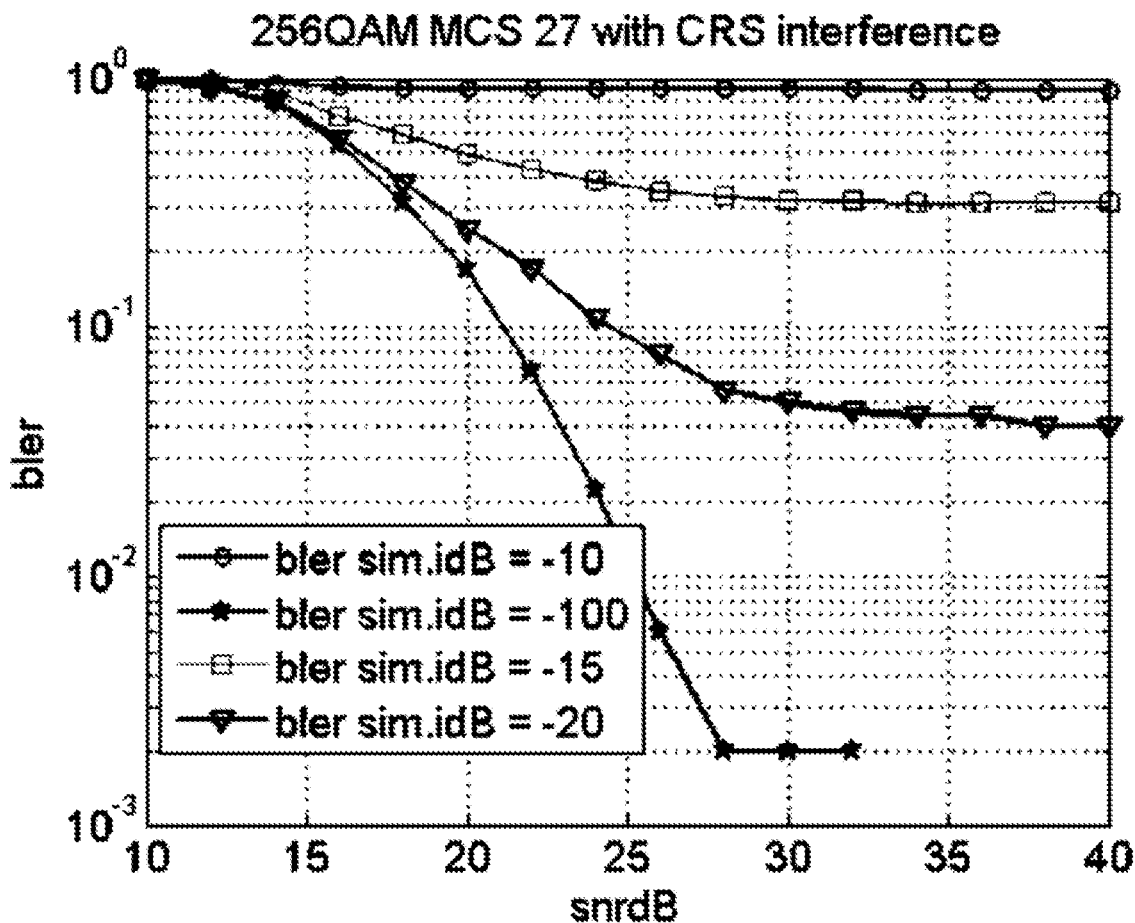
FIG. 4 is a diagram illustrating measurements of how reception performance in one cell are impacted by different levels of interference caused by CRSes transmitted in another cell.

The effects of the CRS interference in terms of reception performance can be seen in FIG. 4 where the Block Error Rate, BLER is depicted versus the Signal to Noise Ratio, SNR, using 256 QAM and the Modulation and Coding Scheme MCS 27, for a few different levels {−10, −15, −20, −100} dB of interfering CRSes. Even with CRS interference that is 15 dB weaker than the serving cell signals the BLER saturates around 30%, which is well above the typical BLER target of 10%.

It was mentioned above that the impact of interference from transmission of reference signals in a scheduling block can be reduced, according to the embodiments herein, by applying a time offset in one cell relative the other cell so that the reference signals will not completely coincide with single REs in the other cell. Thereby, the impact of interference from a reference signal in a scheduling block transmitted in one cell will be distributed over several resource elements in the scheduling block transmitted in the opposite cell so that the impact of interference in each resource element is reduced, as compared to when all interference from the reference signal hits one single resource element when no time offset is used. This will be described in more detail below, e.g. with reference to FIG. 6 which corresponds to FIG. 3 but with the time offset applied.

The solution and some possible embodiments will now be described in terms of functionality in a network node when serving a first cell in a wireless network. The network node is operative to reduce interference in a second cell caused by transmission of reference signals in the first cell. Although the term "network node" is used throughout this description, other alternative terms that could also be used may include base station, eNodeB, access point, radio node, radio network node, and so forth.

An example will now be described, with reference to the flow chart in FIG. 5, of how the solution may be employed in terms of actions which may be performed in a network node serving a first cell in a wireless network, for reducing interference in a second cell caused by transmission of reference signals in the first cell. A first optional action 500 illustrates that the network node in this procedure may determine a time offset for transmission of a scheduling block which contains reference signals located in predefined resource element positions. Some examples of how the time offset may be determined in practice will be described later below. In a next optional action 502, the network node may signal the time offset to one or more wireless devices, e.g. by including the time offset in network assistance information. This information about the time offset can then be utilized by the wireless devices to support Interference cancellation, IC.

A final action 504 illustrates that the network node transmits in the first cell a scheduling block where a number of said reference signals are located in predefined resource element positions in the scheduling block, using a time offset relative transmission of a scheduling block in the second cell. Thereby, it is an advantage that the impact of interference from each reference signal in the scheduling block transmitted in the first cell will be distributed over several resource elements in the scheduling block transmitted in the second cell, so that the interference hitting each individual resource elements is reduced, as explained above. Even though the interference from a reference signal in the first cell will hit multiple resource elements in the second cell instead of one, the wanted signal in each resource element can be detected and decoded more successfully due to the lower peak interference.

Figure 5:
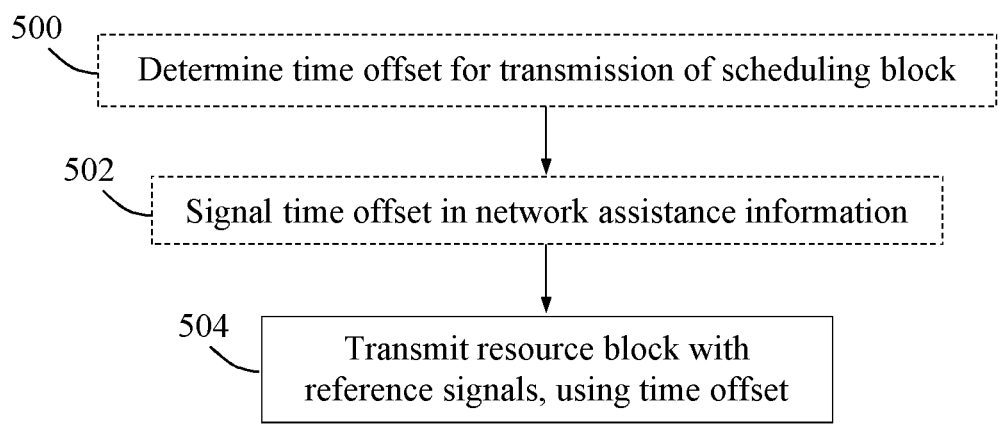
FIG. 5 is a flow chart illustrating a procedure in a network node, according to some possible embodiments.
Figure 6:
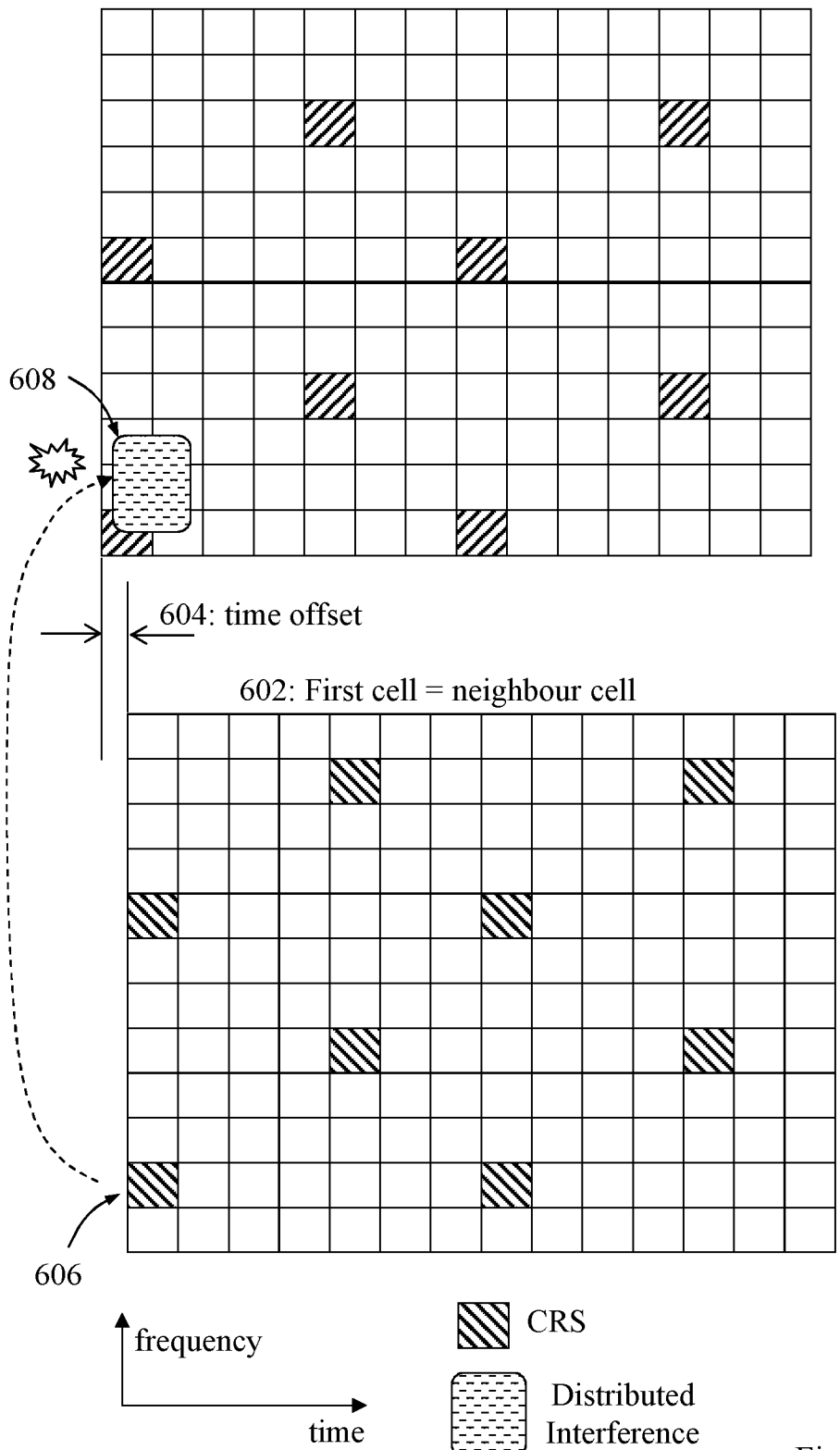
FIG. 6 illustrates how the interference caused by transmission of CRSes in a first cell can be reduced in a second cell by using a time offset, according to further possible embodiments.

This reduced impact of interference is illustrated in FIG. 6 where a scheduling block 600 is transmitted in the second cell, corresponding to the above-mentioned serving cell, and a scheduling block 602 is transmitted in the first cell, corresponding to the above-mentioned neighbour cell, with a time offset 604 relative the scheduling block 600 in the second cell. The reference signals are represented by CRSes in FIG. 6 for short, although it should be understood that other types of reference signals could also be used in the manner described herein and the solution is thus not limited in this respect. The network node that performs the actions in FIG. 5 corresponds to the network node that transmits the scheduling block 602 in FIG. 6 with the time offset 604 applied, in this case a slight delay relative the scheduling block 600 which is less than one OFDM symbol in time domain.

In the example of FIG. 6, the above-described CRS shift is also applied in the first cell by shifting the CRSes in the scheduling block 602 one RE in the frequency domain relative the corresponding CRSes in the scheduling block 600. FIG. 6 illustrates that an example CRS 606 transmitted in the first cell causes interference 608 in the second cell which is distributed, i.e. spread out, over several REs in the second cell both in the time domain and in the frequency domain, in this case roughly six REs, as a result of the applied time offset 604. If the inventive time offset 604 is applied but no CRS shift is applied, the CRS interference would still be distributed over roughly four REs, not shown, thus reducing the peak interference that hits one RE.

Some optional embodiments that may be employed in the above procedure of FIG. 5 will now be described. In one example embodiment, the time offset used when transmitting the scheduling block in action 504 may be a fraction of the duration of an OFDM symbol, as also mentioned above. This will provide a distribution of the interference power hitting the opposite cell over multiple REs, as illustrated in FIG. 6. In this case, the time offset may, in further example embodiments, be any of ½, ⅓ and ⅔ of the duration of an OFDM symbol. In another example embodiment, the time offset may be larger than the duration of a cyclic prefix. The cyclic prefix is used in OFDM, as mentioned above, and acts as a buffer region or guard interval to protect the OFDM signals from inter-symbol interference. The cyclic prefix duration is 0.0047 ms.

Some examples of how the time offset could be determined as of action 500, will now be described. In one example embodiment, the time offset may in a first alternative be determined such that different time offsets are assigned to cells which are expected to interfere with each other by transmission of reference signals. It may be assumed that the interference between transmissions in two cells can be more or less predicted, e.g. based on knowledge about propagation conditions in the two cells. For example, a time offset that provides distribution of the interference over as many REs as possible in the opposite cell may be chosen when the expected interference is high, and vice versa.

In another example embodiment, the time offset may in a second alternative be determined based on a Physical Cell Identity, PCI, of the first cell. In this alternative, another example embodiment, may be that the time offset denoted "offset" is determined in more detail as:

$$\text{offset}=(PCI \bmod N)*T_{symb}/N$$

where N is the total number of time offsets used in the wireless network, and $T_{symb}$ is the duration of an OFDM symbol.

In another example embodiment, the time offset may in a second alternative be determined based on statistics of so-called "mobility measurements" performed by wireless devices on the reference signals. Wireless devices are thus configured to perform measurements of reference signals transmitted both in their serving cell and in neighbour cells, to be used as a basis for handover decisions. Such mobility measurements can be obtained from measurement reports from the wireless devices which typically indicate how well signals transmitted in one cell can be heard in another cell. For example, a time offset that provides distribution of the interference over as many REs as possible in the opposite cell may be chosen when the mobility measurements indicate that signals from one cell can be heard well in a neighbour cell, and vice versa.

In another example embodiment, the reference signals may be Cell-specific Reference Signals, CRSes, which has been used as an example reference signal throughout this description. It was mentioned above that the network node may signal the time offset to one or more wireless devices, as shown by the optional action 502. In another example embodiment, the time offset may be included in network assistance information, such as in a CRS-AssistanceInfo-r11 message, signalled to a wireless device. Thereby, the wireless device is able to use the time offset to assist the procedure of IC which is usually performed in wireless devices for improved signal detection, which is however beyond the scope of this disclosure. In another example embodiment, the wireless network may be a Long Term Evolution, LTE, network and Orthogonal Frequency Division Multiplexing, OFDM, may be used, although the solution is not strictly limited thereto.

Figure 7:
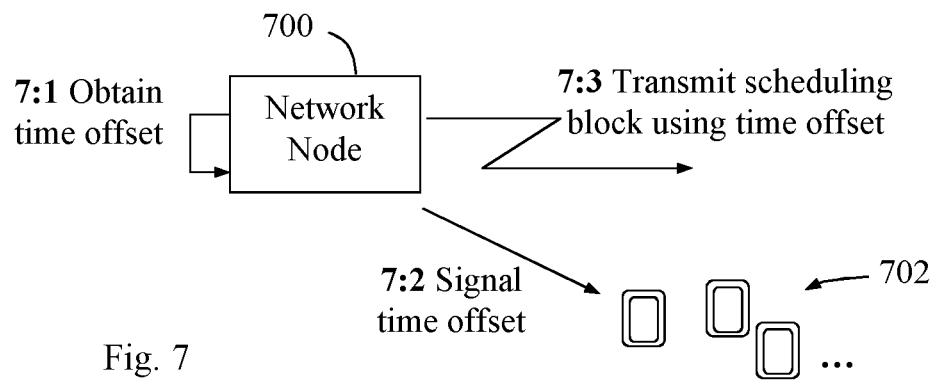
FIG. 7 is a communication scenario where the solution is used, according to further possible embodiments.

FIG. 7 illustrates a communication scenario where the above-described embodiments can be used involving a network node 700 serving a first cell, which node is configured to perform the actions in FIG. 5. A first action 7:1 illustrates that the network node 700 obtains the above-described time offset relative transmissions in a second cell, which may have been determined according to any of the above alternatives. The determination of the time offset may be performed by the network node 700 itself or by another node or entity, not shown, from which the network node 700 can obtain the time offset. Action 7:1 thus corresponds to action 500.

In a next action 7:2, the network node 700 signals the time offset to one or more wireless devices 702, which corresponds to action 502. A final action 7:3 illustrates that the network node 700 transmits a scheduling block using the obtained time offset, which corresponds to action 504.

Figure 8:
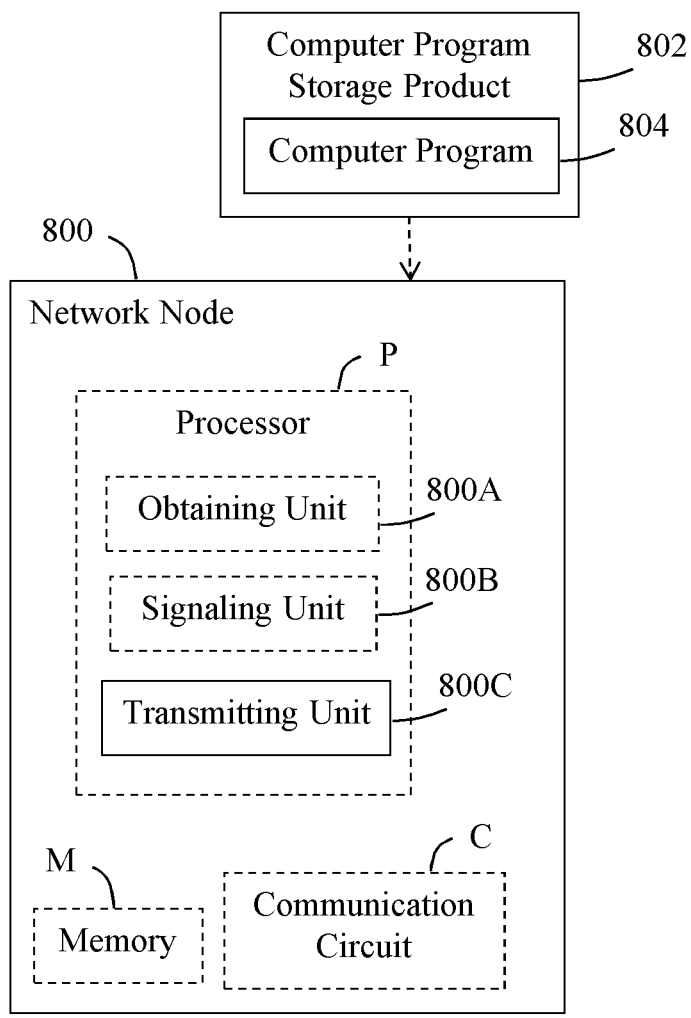
FIG. 8 is a block diagram illustrating a network node in more detail, according to further possible embodiments.

The block diagram in FIG. 8 illustrates a detailed but non-limiting example of how a first network node 800 may be structured to bring about the above-described solution and embodiments thereof. The first network node 800 may be configured to operate according to any of the examples and embodiments of employing the solution as described above, where appropriate, and as follows. The first network node 800 is shown to comprise a processor P and a memory M, said memory comprising instructions executable by said processor P whereby the first network node 800 is operable as described herein. The first network node 800 also comprises a communication circuit C with suitable equipment for receiving and transmitting signals in the manner described herein.

The communication circuit C is configured for communication with wireless devices and other network nodes using suitable protocols depending on the implementation. This communication may be performed in a conventional manner over a communication network employing radio links for wireless communication, which is not necessary to describe here as such in any detail. The solution and embodiments herein are thus not limited to using any specific types of networks, technology or protocols for radio communication.

The first network node 800 is operable in a wireless network and comprises means configured or arranged to perform at least some of the actions 500-504 and 7:1-7:3 in FIGS. 5 and 7, respectively. The first network node 800 is arranged to serve a first cell in the wireless network, and to reduce interference in a second cell caused by transmission of reference signals in the first cell.

The first network node 800 may be configured to determine or otherwise obtain a time offset for transmission of a scheduling block which contains reference signals located in predefined resource element positions. This operation may be performed by an obtaining unit 800A in the first network node 800, e.g. in the manner described for action 500 above. As indicated above, the network node 700 may itself determine the time offset or obtain it from another node or entity.

The first network node 800 may also be configured to signal the time offset to one or more wireless devices, e.g. by including the time offset in signalled network assistance information. This operation may be performed by a signalling unit 800B in the first network node 800, e.g. as described for action 502 above.

The first network node 800 is configured to transmit in the first cell a scheduling block where a number of said reference signals are located in predefined resource element positions in the scheduling block, using a time offset relative transmission of a scheduling block in the second cell. This operation may be performed by a transmitting unit 800C in the first network node 800, e.g. as described above for action 504.

It should be noted that FIG. 8 illustrates various functional units in the first network node 800, and the skilled person is able to implement these functional units in practice using suitable software and hardware. Thus, the solution is generally not limited to the shown structures of the first network node 800, and the functional units 800A-C therein may be configured to operate according to any of the features and embodiments described in this disclosure, where appropriate.

The functional units 800A-C described above can be implemented in the first network node 800 by means of suitable hardware and program modules of a computer program comprising code means which, when run by the processor P causes the first network node 800 to perform at least some of the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the first network node 800 in the form of a memory having a computer readable medium and being connected to the processor P. The computer program product or memory in the first network node 800 may thus comprise a computer readable medium on which the computer program is stored e.g. in the form of computer program modules or the like. For example, the memory may be a flash memory, a Random-Access Memory (RAM), a Read-Only Memory (ROM), an Electrically Erasable Programmable ROM (EEPROM) or hard drive storage (HDD), and the program modules could in alternative embodiments be distributed on different computer program products in the form of memories within the first network node 800.

The solution described herein may be implemented in the first network node 800 by means of a computer program storage product 802 comprising a computer program 804 with computer readable instructions which, when executed on the first network node 800, cause the first network node 800 to carry out the actions according to any of the above embodiments, where appropriate.

Figure 9:
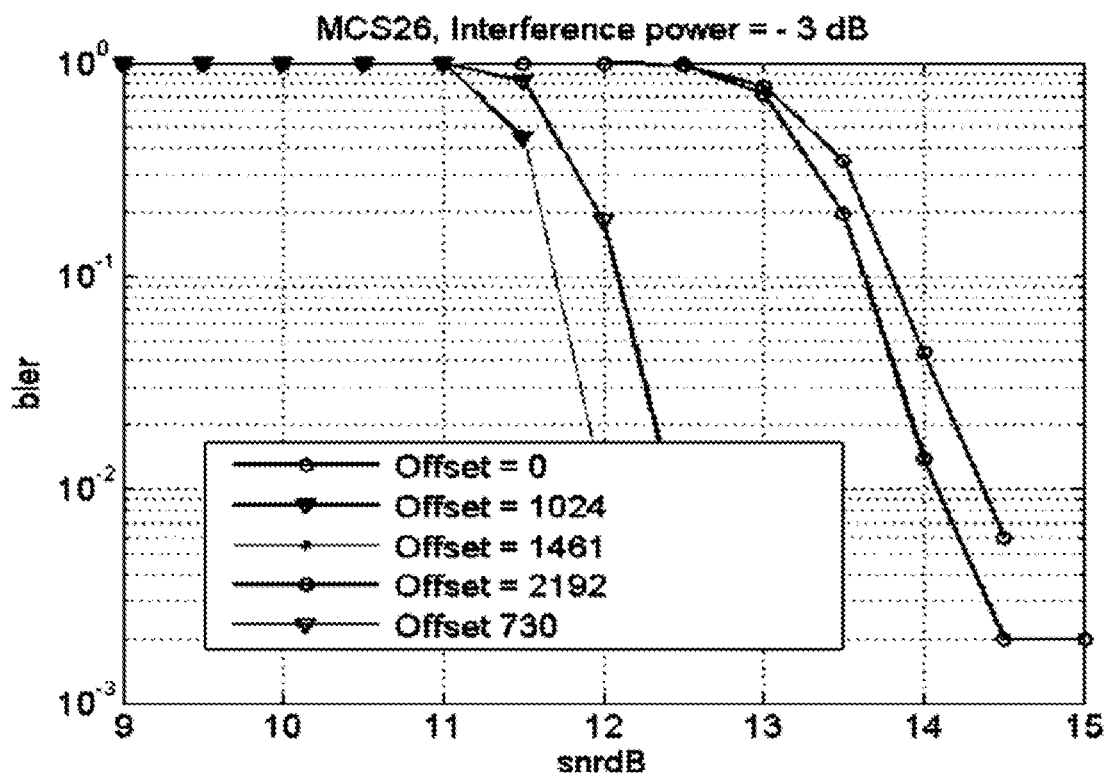
FIG. 9 is a diagram illustrating measurements of reception performance in one cell when using different time offsets and shifted CRSes in another cell.

By introducing a time offset between the downlinks of different cells that is a fraction of an OFDM symbol, the peak interference power can thus be reduced. FIG. 9 illustrates how the reception performance in terms of BLER for shifted CRSes and MCS 26 can be improved by using different time offsets as described herein. Offset 2192 corresponds to 1 OFDM symbol. It can be seen that with an interfering signal that is 3 dB weaker than a serving signal, the SNR required to reach 10% BLER can be reduced by roughly 1.5-2 dB.

When the CRS interference is spread out over several resource elements by using a time offset as described herein, the difference between the CRSes and the data carrying resource elements will be reduced. This means that the decoder is able to use a better estimate of the quality of each resource element, and this improvement will contribute to a better decoding performance.

Figure 10:
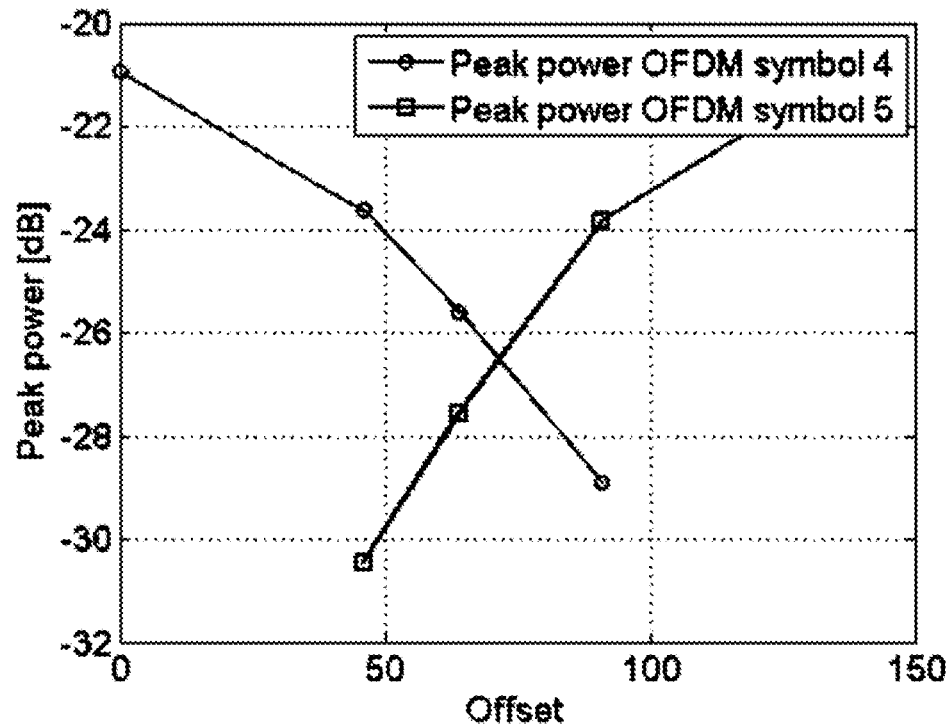
FIG. 10 is a diagram illustrating measurements of peak interference power in two adjacent OFDM symbols for different time offsets.

This is illustrated in FIG. 10 where the peak interference power in two adjacent OFDM symbols 4 and 5 of a victim cell, caused by transmission in an interfering cell, is plotted versus the time offset used in either cell. Here, a time offset equal to 137 corresponds to one OFDM symbol. It can be seen that a time offset equal to 68.5 corresponding to ½ OFDM symbol will spread out the interference power equally over the OFDM symbols 4 and 5. However, a time offset of ½ OFDM symbol would only provide 2 different time shifts. A more practical time shift would be to use multiples of ⅓ OFDM symbol, i.e. time offset=45.6, and according to the figure this would still provide a reduction in peak interference power by ~3 dB.

Scenarios where the most gain of using the time offset can be expected include:
A) Shifted CRSes, as illustrated in FIG. 6. There will also be positive effects for non-shifted CRSes, but the gain will then be in terms of better CQI and RI reporting which has not been quantized.
B) Low Physical Resource Block, PRB, utilization in neighbour cells. As the PRB utilization in neighbour cells increase, the interference term will be dominated by PDSCH interference and the gain of using the time offset will decrease.

Figure 11:
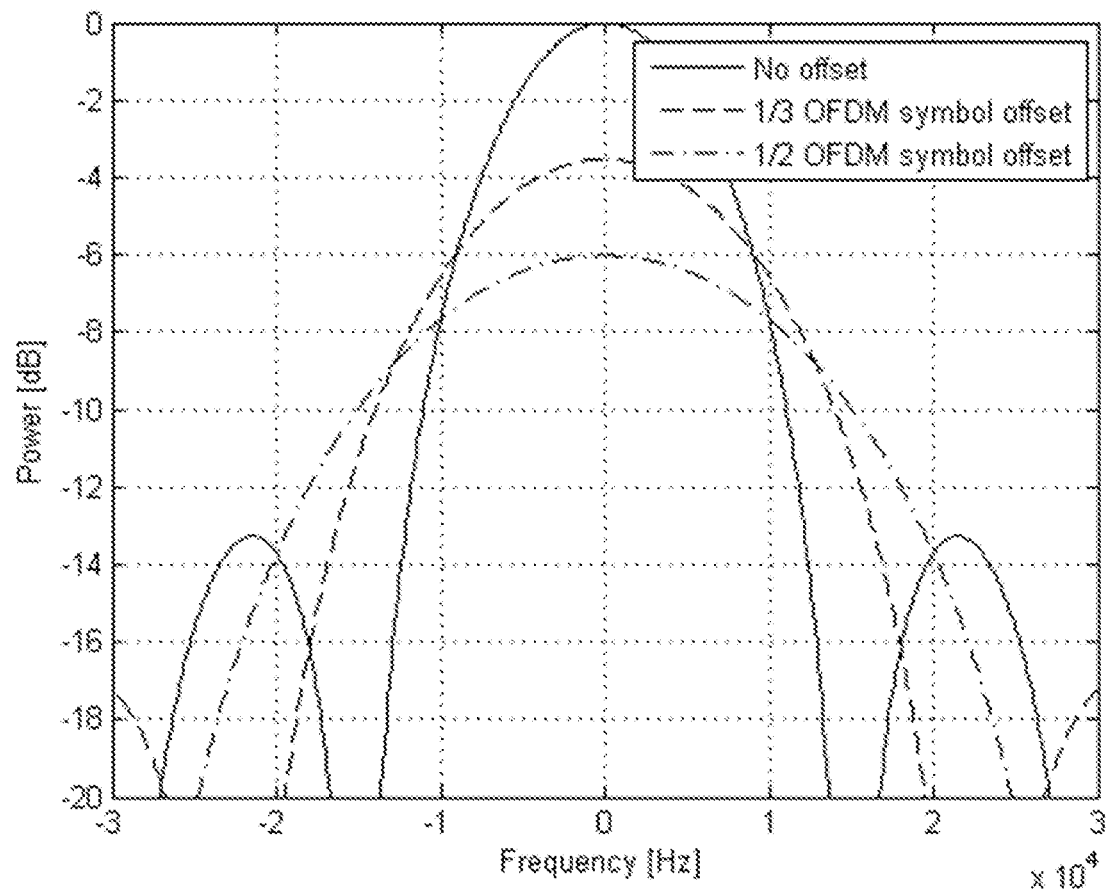
FIG. 11 is a diagram illustrating power leakage from a transmission when no time offset and when time offsets of ⅓ and ½ OFDM symbol are applied.

Finally, FIG. 11 illustrates how the power "leakage" of a transmission on a frequency denoted "0" "leaks" between subcarriers within an OFDM symbol when no time offset is applied and when time offsets of ⅓ and ½ OFDM symbol, respectively, are applied. With no time offset applied, no power leaks into adjacent subcarriers which can be seen by the sharp dips is the received power at frequencies +/−15000 Hz (the subcarrier spacing). When the offset changes to ½ symbol, it can be expected that half the power (equal to 3 dB) is shifted to an adjacent OFDM symbol. The remaining power is distributed within the OFDM symbol so that half the remaining power stays within the transmitted subcarrier, and the rest leaks out to other subcarriers. This can be seen from the fact that the power on the "0" HZ subcarrier has dropped 6 dB, i.e. down to ¼ of the original power, and that the power at +/−15000 KHz does not drop to 0, but to approximately −10 dB which corresponds to 10% of the original transmitted power. It can thus be seen in this figure that the peak power that hits a resource element at frequency 0 can be considerably reduced by applying the above-described time offset.

While the solution has been described with reference to specific exemplifying embodiments, the description is generally only intended to illustrate the inventive concept and should not be taken as limiting the scope of the solution. For example, the terms "cell", "network node", "reference signals", "scheduling block", "resource element", "time offset", "OFDM symbol", "shifted CRSes", "cyclic prefix" and "mobility measurements" have been used throughout this disclosure, although any other corresponding entities, functions, and/or parameters could also be used having the features and characteristics described here. The solution is defined by the appended claims.

The invention claimed is:

1. A method performed by a network node, the method comprising:
   serving a first cell in a wireless network;
   reducing interference in a second cell caused by transmission of reference signals in the first cell, wherein reducing the interference comprises transmitting in the first cell a scheduling block where a number of said reference signals are located in predefined resource element positions in the scheduling block, using (i) a frequency shift and (ii) a time offset relative to a transmission of a scheduling block in the second cell, wherein the time offset is a fraction of a duration of an OFDM symbol; and
   transmitting time offset information specifying the time offset, wherein the time offset is determined based on a total number of time offsets used in the wireless network.

2. The method of claim 1, wherein the time offset is any of ½, ⅓, and ⅔ of the duration of the OFDM symbol.

3. The method of claim 1, wherein the time offset is larger than a duration of a cyclic prefix.

4. The method of claim 1, wherein the time offset is determined such that different time offsets are assigned to cells which are expected to interfere with each other by transmission of reference signals.

5. The method of claim 1, wherein the time offset is determined based on a Physical Cell Identity (PCI) of the first cell.

6. The method of claim 5, wherein the time offset is determined as:

offset=(PCI mod $N$)*$T$symb/$N$ where N is a total number of time offsets used in the wireless network, and Tsymb is the duration of the OFDM symbol.

7. The method of claim 1, wherein the time offset is determined based on statistics of mobility measurements performed by wireless devices on the reference signals.

8. The method of claim 1, wherein the reference signals are Cell-specific Reference Signals.

9. The method of claim 1, wherein the time offset is included in network assistance information signaled to a wireless device.

10. The method of claim 1, wherein a resource element used for transmission of a reference signal in the first cell overlaps at least four resource elements used for transmission of data in the second cell.

11. A computer program product comprising a non-transitory computer readable medium storing a computer program comprising instructions which, when executed on at least one processor, cause the at least one processor to carry out the method of claim 1.

12. A network node, the network node comprising:
a memory;
a communication circuit; and
a processor, the processor being configured to cause the network node to:
serve a first cell in a wireless network;
reduce interference in a second cell caused by transmission of reference signals in the first cell, wherein reducing the interference comprises transmitting in the first cell a scheduling block where a number of said reference signals are located in predefined resource element positions in the scheduling block, using (i) a frequency shift and (ii) a time offset relative to a transmission of a scheduling block in the second cell, wherein the time offset is a fraction of a duration of an OFDM symbol; and
transmitting time offset information specifying the time offset, wherein the time offset is determined based on a total number of time offsets used in the wireless network.

13. The network node of claim 12, wherein the time offset is any of ½, ⅓, and ⅔ of the duration of the OFDM symbol.

14. The network node of claim 12, wherein the time offset is larger than a duration of a cyclic prefix.

15. The network node of claim 12, wherein the network node is configured to determine the time offset such that different time offsets are assigned to cells which are expected to interfere with each other by transmission of reference signals.

16. The network node of claim 12, wherein the network node is configured to determine the time offset based on a Physical Cell Identity (PCI) of the first cell.

17. The network node of claim 16, wherein the network node is configured to determine the time offset as:

offset=(PCI mod $N$)*$T$symb/$N$ where N is a total number of time offsets used in the wireless network, and Tsymb is the duration of the OFDM symbol.

18. The network node of claim 12, wherein the network node is configured to determine the time offset based on statistics of mobility measurements performed by wireless devices on the reference signals.

19. The network node of claim 12, wherein the reference signals are Cell-specific Reference Signals.

20. The network node of claim 12, wherein the network node is configured to include the time offset in network assistance information signaled to a wireless device.

21. A method performed by a network node, the method comprising:
serving a first cell in a wireless network;
reducing interference in a second cell caused by transmission of reference signals in the first cell, wherein reducing the interference comprises transmitting in the first cell a scheduling block using a time offset relative to a transmission of a scheduling block in the second cell, wherein the time offset is a fraction of a duration of an OFDM symbol; and
transmitting time offset information specifying the time offset, wherein the time offset is determined based on a total number of time offsets used in the wireless network.

22. The method of claim 21, wherein the time offset information enables a user equipment (UE) to perform interference cancellation.

* * * * *